A. W. HAWKINS.
THIRD POINT SUPPORT FOR BRAKE BEAMS.
APPLICATION FILED APR. 19, 1920.
1,397,580.
Patented Nov. 22, 1921.
2 SHEETS—SHEET 1.
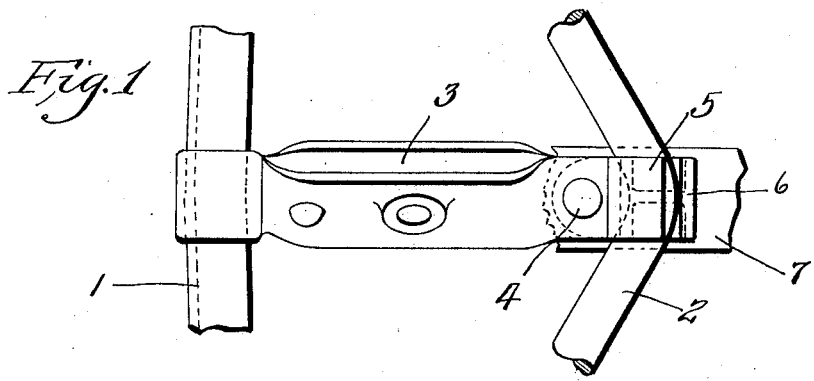
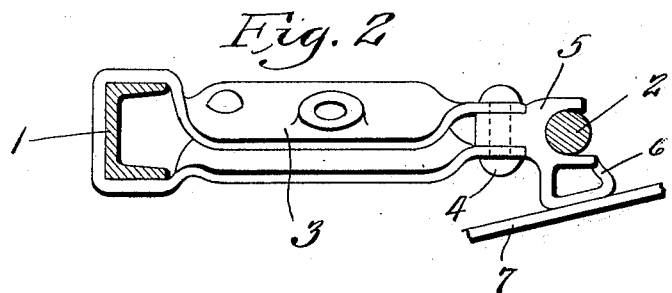
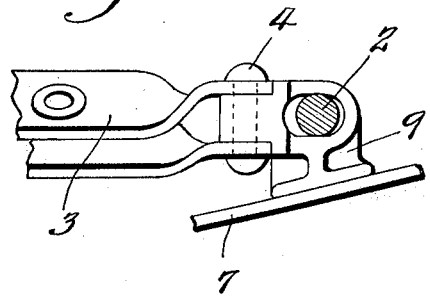
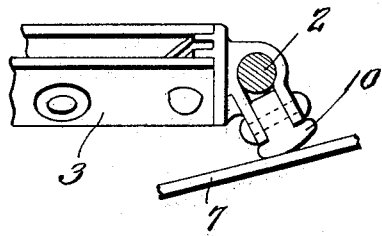
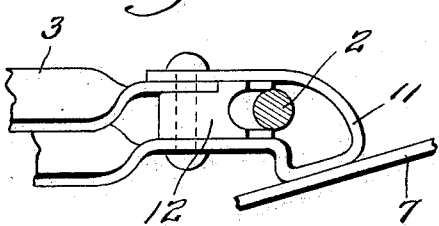
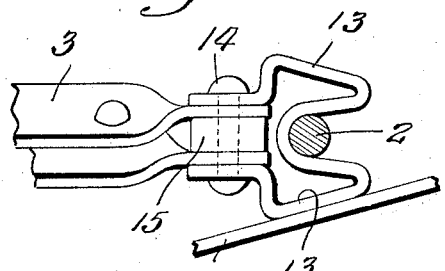
Inventor
Arthur W. Hawkins
By [signature], Atty.

A. W. HAWKINS.
THIRD POINT SUPPORT FOR BRAKE BEAMS.
APPLICATION FILED APR. 19, 1920.

1,397,580.

Patented Nov. 22, 1921.
2 SHEETS—SHEET 2.

Inventor
Arthur W. Hawkins
By

UNITED STATES PATENT OFFICE.

ARTHUR W. HAWKINS, OF CHICAGO, ILLINOIS, ASSIGNOR TO CHICAGO RAILWAY EQUIPMENT COMPANY, OF CHICAGO, ILLINOIS, A CORPORATION OF ILLINOIS.

THIRD-POINT SUPPORT FOR BRAKE-BEAMS.

1,397,580.      Specification of Letters Patent.      Patented Nov. 22, 1921.

Application filed April 19, 1920. Serial No. 374,980.

*To all whom it may concern:*

Be it known that I, ARTHUR W. HAWKINS, a citizen of the United States, residing at Chicago, Cook county, Illinois, have invented a certain new and useful Improvement in Third-Point Supports for Brake-Beams, of which the following is a full, clear, and exact description, such as will enable others skilled in the art to which it appertains to make and use the same, reference being had to the accompanying drawings, forming part of this specification, in which—

Figure 1 is a top plan view of a part of a brake beam provided with my third point support.

Fig. 2 is a side elevational view of the strut shown in Fig. 1.

Figs. 3 to 12 are side elevational views showing modified forms of my improved third point support.

Figure 7:
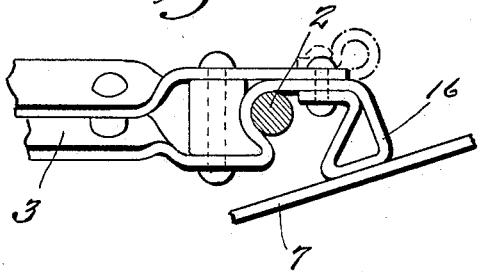

This invention relates to a new and useful improvement in third point supports for brake beams, the object being to provide a forged strut with a third point support secured between its inner ends, *i. e.*, the ends which are nearest the tension member of the beam, which third point support is either removable or integral with the strut.

In the drawings 1 indicates the compression member of the brake beam and 2 the tension member thereof.

In Figs. 1 and 2, 3 indicates a forged strut in the form of a strap bent around and embracing the compression member, the inner ends of which strut are secured by a rivet 4 to a tension member saddle piece 5 having a third point support 6 dependent therefrom, and which third point support is designed to coöperate with an inclined track member 7 secured to a part of the truck of the car.

In Fig. 3, the third point support 9 is provided with an opening through which the tension member 2 passes, while in Fig. 4 the third point support is provided with a renewable nose or wearing surface 10.

In Fig. 5, I have shown the strut as being bent upon itself and around the tension member 2 forming a third point support 11, the tension member 2 resting in a saddle bar 12 secured between members of the strut and serving as a spacing block therefor.

In Fig. 6, I have shown a reversible third point support 13 constituting a seat for the tension member 2, and which is secured by a rivet 14 to the inner end of the strut members which are spaced apart by a block 15.

In Fig. 7, I have shown a strut spaced apart at its inner end and refolded upon itself to form a third point support 16.

Figure 8:
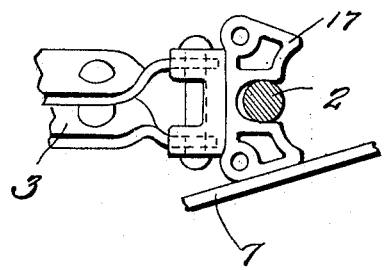

In Fig. 8, I have shown a casting 17 which forms a saddle or seat for the tension member and to which the ends of the strut are riveted.

Figure 9:
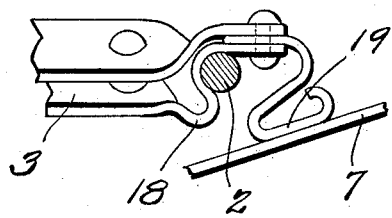

In Fig. 9, I have shown the strut provided with a jog or bent portion forming a saddle for the tension member, while the third point support 19 is in the form of a flat spring secured to the outstanding ends of the strut.

Figure 10:
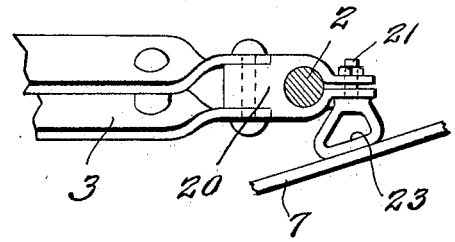

In Fig. 10, I have shown the spacing member 20 as being provided with clamping lugs which embrace the tension member 2 securing the bolt 21 therefor holding the third point support 23 in position.

Figure 11:
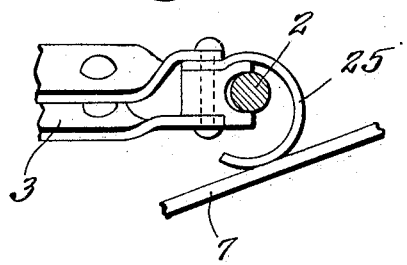

In Fig. 11, I have shown the third point support in the form of a curved spring 25 which is connected to the inner end of the strut and spacing block for the saddle.

Figure 12:
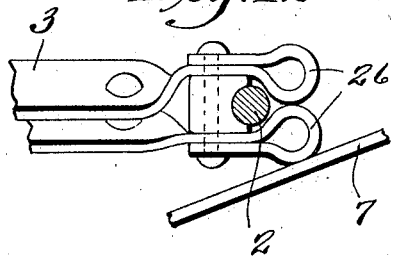

In Fig. 12, I have shown the inner ends of the strut refolded upon itself to form third point supports 26 whereby the beam is reversible.

What I claim is:

1. A third point support for brake beams comprising a strut, a saddle connected to the strut for seating a brake beam tension member, and a third point support carried by said saddle.

2. A brake beam comprising a compression member, a tension member and a strut, the inner ends of which latter are separated, a spacing member for spacing the inner ends of the strut and providing a seat for the tension member, said spacing member also providing a means for the attachment of a third point support.

3. A brake beam comprising a compression member, a tension member and a strut, the latter having its inner ends spaced apart, a spacing block between said inner ends, said spacing block forming a seat for the tension member and also providing a mount for a third point support.

4. A brake beam comprising a compression member, a tension member and a strut, the latter having its inner ends spaced apart, and a forging secured to said inner ends, said forging having a seat for the tension member and a rubbing shoe to form a third point support.

In testimony whereof I hereunto affix my signature this 25th day of March, 1920.

ARTHUR W. HAWKINS.